United States Patent Office 3,851,058
Patented Nov. 26, 1974

---

3,851,058
METHODS FOR IMPROVING THE FEED INTAKE OF HEALTHY RUMINANTS EMPLOYING CERTAIN BENZODIAZEPINES
Clifton A. Baile, Glen Mills, Carol Lynn McLaughlin, Malvern, and Robert Lee Webb, West Chester, Pa., assignors to Smithkline Corporation, Philadelphia, Pa.
No Drawing. Filed Sept. 6, 1973, Ser. No. 394,902
Int. Cl. A61k 27/00
U.S. Cl. 424—244                  7 Claims

ABSTRACT OF THE DISCLOSURE

Compositions and methods for inducing polyphagia in immature healthy ruminant animals comprise administering orally or by injectaion an effective but nontoxic sub-pharmacodynamic quantity of a 1,4-benzodiazepine active ingredient. A preferred active ingredient is 1-cyclopropylmethyl-7-chloro - 5-o-chlorophenyl-2,3-dihydro-[2H]-1,4-benzodiazepine or one of its nontoxic acid addition salts.

---

This invention relates to new methods and compositions for inducing polyphagia in healthy, immature ruminant animals especially in feeder sheep and cattle, using as an active ingredient certain 1,4-benzodiazepines optimally substituted at the 1,5 and 7-position and especially a 1-cyclopropylmethyl - 7 - halo-5-(halophenyl)-1,4-benzodiazepine. More specifically this method comprises the internal administration to the growing animal either orally admixed in the feed or by injection, preferably by implant, of a quantity of 1,4- benzodiazepine ingredient nontoxic or not overtly pharmacodynamic but sufficient to induce the desired polyphagia in the subject animal. The compositions of this invention are veterinary feed or injectable preparations containing active but nontoxic quantities of the 1,4-benzodiazepine ingredients.

Polyphagia implies an inducement of the animal to eat past its point of satiety thereby increasing the weight of the animal more quickly than normal. This enables the feed lot operator to turn over his pens or lots more quickly. Polyphagia is distinct from more standard means of increasing the feed efficiency of meat-producing animals which involve more efficient use of the animal feed but no *increase* in the amount ingested by the animal. Certain 1,4-benzodiazepines distinct from the preferred active ingredients of this invention in structure have been described to have utility as standard feed additives, German Pat. 2,233,117 and U.S. Pat. 3,248,223. Both of these previous inventions are described in the art to be applied to monogastric and ruminant farm animals across the board.

The chemicals which are the active ingredients of this invention are preferably a narrow class of compounds which have been described generally in the art. U.K. Pat. 1,148,227 and U.S. Pat. 3,192,200 and U.S. Pat. 3,192,-199. The latter patent describes methods of synthesis for the chemicals. In none of these patents are there described any application of the ingredients to the animal field, and certainly not to the feed lot application described here.

The structure of the preferred cyclopropylmethyl 1,4-dibenzodiazepines of this invention are illustrated by the following general structural formula:

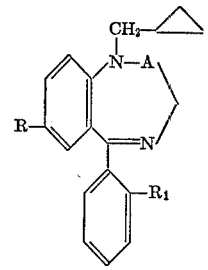

FORMULA I in which:

R is trifluoromethyl or halo such as fluoro, bromo, iodo or chloro;
A is keto or methylene; and
$R_1$ is trifluoromethyl, halo such as fluoro, bromo, iodo or chloro or, when A is keto, hydrogen.

The most active compounds are those in which R and $R_1$ are both halo, most preferably chloro. An advantageous ingredient is 1-cyclopropylmethyl-7-chloro-5-o-chlorophenyl-2,3-dihydro-[2H]-1,4-benzodiazepine and its stable, nontoxic acid addition salts.

The specificity of structure on quantitative polyphagic activity is illustrated by the fact that in the screening test described below 1-cyclohexylmethyl-7-chloro-5-o-chlorophenyl - 1,3 - dihydro-[2H]-benzodiazepine-2-one hydrochloride has little activity in sheep at 10 mg. while its 1-cyclopropylmethyl congener has significant activity at 5 mg. 7-chloro-1-cyclopropylmethyl - 2,3 - dihydro-5-phenyl-[1H]-1,4-benzodiazepine hydrochloride has little activity in the steer test at 50 mg. while its 2-keton congener has very significant activity at 50 mg.

Since the active ingredients are bases, they may be equivalently used as their nontoxic acid addition salts with pharmaceutically acceptable acids which are also made by standard methods of preparing salts such as reacting the base in an organic solvent such as ether or benzene with an excess of the desired acid. Exemplary salty are prepared from acetic, sulfuric, hydrochloric, hydrobromic, sulfacim, methanesulfonic, p-toluenesulfonic, pamoic, resin, nitric, phosphoric, lactic and similar acids. Water soluble salt forms are particularly useful for injectable or implant compositions. These include particularly the salts with common mineral acids.

The active compounds such as those of Formula I can be administered to the healthy immature animals internally, i.e., either intramuscularly or subcutaneously in the form of sterile veterinary solutions or suspensions for injection or preferably as veterinary pellet implants. More advantageously the compounds can be dispersed throughout conventional ruminant animal feed compositions. The feed compositions are then fed to healthy immature ruminant animals, according to methods well-known to the agricultural art. The amount of the active ingredient in the composition will be a quantity of the cyclopropylmethylhalo-1,4-benzodiazepine sufficient to induce polyphagia in the satiated immature healthy ruminant animal but not be overtly toxic or pharmacodynamic in the animal subject.

The animal feeds most generally used in conjunction with the method of this invention are either various grain mixtures and/or roughage feeds such as chopped hay commonly fed to growing ruminant animals such as cattle or sheep. The amount of additive used to supplement such feeds will be in an amount sufficient to increase feed intake and/or improve the feed efficiency of the animal but not to have a toxic or noxious effect; in the broad range of from about 10 mg. to 100 g. per ton of feed, preferably from about 500 mg. to about 20 g. per ton. An average feeder sheep will ingest about 3–4 lbs. of feed daily; an average feeder steer, about 20–25 lbs. The dose range per sheep daily is a nontoxic but active quantity of active ingredient in the range of from about 20 $\mu$g. to 200 mg., preferably about 1 mg. to 40 mg. The dose range for cattle daily is chosen from about 100 $\mu$g. to 2 g., preferably about 10 mg. to 1 g. The overall broad range of dosage for ruminants is within approximately 10 $\mu$g. to 2.5 g. per day, preferably from 1 mg. to 1 g. per ruminant animal per day.

Generally the methods of this invention using parenteral administration comprise injecting by implant a polyphagic but nontoxic amount of the active ingredient such as the daily dosage quantities mentioned which are based on the activity of the most preferred compound. Administration may be usually at most once a day but may be varied as polyphagia is desired. Usually the treatment may take place every several days, weeks or even months. The implant forms of the invention might be used only one to three or four times in the growing time of the animal. They might be administered in the ear or intramuscularly in the hind quarter of the animal.

For commercial use, the active ingredients when used in the feed can be readily used as premix formulations in which the chemical is distributed uniformly throughout a standard animal feed carrier. This premix or concentrate is then mixed with a normal diet for the animal desired. Examples of such carriers are soybean meal, corn oil, ground corn, barley, wheat, mineral mixtures such as vermiculite, diatomaceous earth, corn gluten meal, corn distillers solubles or soyflour. The active ingredient will be in amounts to satisfy the criteria set forth above for whole feed. The active ingredient will usually be present in from about 1–75% by weight of the premix composition.

The animal feeds themselves may also contain: roughages such as cellulose, hay, straw, silages, corn stalks, cotton seed hulls, oats, barley and cereal brans; natural oils such as animal fats, fish oils, safflower oil, peanut oil, and cottonseed oil; antioxidants, minerals, vitamins, antibiotics, anthelmintics; and other appropriate medicaments.

Examples of typical prepared animal feed is as follows:

EXAMPLE 1

| Ingredients: | Weight percent |
| --- | --- |
| Mixed hay | 40.0 |
| Ground yellow corn | 45.0 |
| Soybean oil meal | 7.0 |
| Cane molasses | 7.0 |
| Dicalcium phosphate | 0.5 |
| Trace mineral salts | .5 |
| Vitamin A | 300 I.U./lb. |
| Vitamin D | 150 I.U./lb. |
| 1-Cyclopropylmethyl-7-chloro - 5 - o-chlorophenyl - 2,3 - dihydro-[2H]-1,4-benzodiazepine hydrochloride | 5 mg./lb. |

The method of this invention using feed compositions comprises allowing the growing animal to graze or be fed ad libitum on the supplemented rations or to be fed on a regular schedule.

EXAMPLE 2

| Ingredients: | Weight percent |
| --- | --- |
| 1-Cyclopropylmethyl - 7 - chloro-5-o-chlorophenyl - 2,3 - dihydro-[2H]-1,4-benzodiazepine hydrochloride | 1 g./lb. |
| Calcium sulfate, dihydrate | 20 mg. |
| Gelatin | 4 mg. |
| Magnesium stearate | 1 mg. |
| Talc | 2 mg. |

The active compound and calcium sulfate, dihydrate are mixed and passed through a #40 standard mesh screen. The screened mixture is then granulated with hot 15% gelatin solution, screened through a #10 mesh screen and dried overnight at 120° F. The granules are again screened through a #40 mesh screen and mixed with the magnesium stearate and talc. The granules are compressed into implants using a ⅛" flat face punch and die. One implant is administered intramuscularly. Other standard methods of preparing and using implants are described in U.S. Pat. No. 3,428,729 and the references contained therein as well as in J. Animal Science, 27, 1772 (1968) or J. Biomed. Mater. Res., 1, 433 (1967).

Other species of the active ingredients of this invention which may be used as described above and which are prepared using methods referred to above are:

7-chloro-1-cyclopropylmethyl-2,3-dihydro-5-phenyl-[1H]-1,4-benzodiazepine-2-one, m.p. 145–146° C.

7-chloro-1-cyclopropylmethyl-2,3-dihydro-5-o-chlorophenyl-[1H]-1,4-benzodiazepine-2-one, m.p. 149–150° C.

7-bromo-1-cyclopropylmethyl-5-o-bromophenyl-2,3-dihydro-[2H]-1,4-benzodiazepine.

7-fluoro-1-cyclopropylmethyl-5-o-trifluoromethylphenyl-1,3-dihydro-[2H]-1,4-benzodiazepine.

7-trifluoromethyl-1-cyclopropylmethyl-5-o-trifluoromethylphenyl-1,3-dihydro-[2H]-1,4-benzodiazepine-2-one.

7-iodo-1-cyclopropylmethyl-5-phenyl-1,3-dihydro-[2H]-1,4-benzodiazepine-2-one.

7-chloro-1-cyclopropylmethyl-5-o-bromophenyl-1,3-dihydro-[2H]-1,4-benzodiazepine-2-one.

As primary screening tests the active ingredients were given by injections to either sheep or cattle in the following procedures:

Sheep I.V. Injections: Four groups of 8 sheep were given fresh feed and one hour later one group was injected intravenously with carrier and the other 3 were injected with carrier plus drug. Feed was weighed at time of injection and 30 and 120 min. later. Feed intakes were calculated for each group. The intakes for the control group were substituted for the previous control intakes for that group to generate a control for the 32 sheep to which intakes following drug injection were compared to a non-paired-t test. The control values are the average of the controls used for the chemical for each day.

STRUCTURE

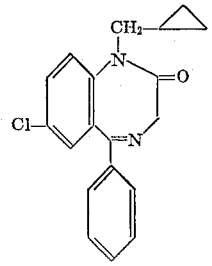

| Dose (mg.) | Feed intake (g.) | | | n |
| --- | --- | --- | --- | --- |
| | 0–30 min. | 30–120 min. | 0–120 min. | |
| Control | 64±10 | 31±6.4 | 95±14 | 24 |
| 10 | 151±36 | 31±8.5 | 183±34 | 8 |
| Control | 74±7.0 | | 97±7.6 | 31 |
| 5 | 124±25 | | 165±27 | 8 |
| 20 | 265±43 | | 339±42 | 8 |

STRUCTURE

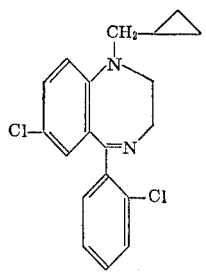

| Dose (mg.) | Feed intake (g.) | | | n |
|---|---|---|---|---|
| | 0-30 min. | 30-120 min. | 0-120 min. | |
| Control | 75±10 | 51±11 | 126±15 | 31 |
| .31 | 67±23 | 125±22 | 193±35 | 8 |
| .63 | 93±21 | 94±31 | 187±32 | 8 |
| 1.25 | 147±21 | 69±13 | 216±25 | 8 |
| 2.5 | 144±12 | 49±7.2 | 193±8.9 | 7 |
| 10 | 36±17 | 133±27 | 169±33 | 7 |

STRUCTURE

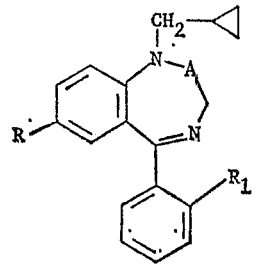

| Dose (mg.) | Feed intake (g.) | | | n |
|---|---|---|---|---|
| | 0-30 min. | 30-120 min. | 0-120 min. | |
| Control | 90±12 | 62±9.9 | 153±12 | 32 |
| .65 | 113±24 | 77±29 | 190±21 | 8 |
| 1.25 | 142±23 | 38±11 | 180±21 | 8 |
| 2.5 | 123±23 | 64±20 | 187±28 | 8 |
| 5 | 146±49 | 51±22 | 197±42 | 8 |
| 20 | 194±13 | 78±20 | 276±26 | 8 |

Cattle I.V. Injections: Each of 4 groups of cattle was given fresh feed and 1 hour later injected intravenously with carrier alone, or with carrier plus chemical. Feed was weighed at time of injection and 60 and 120 min. later. Feed intakes were calculated for each group. The intakes for the control group were substituted for the previous control for that group to generate a control for the 32 cattle to which intakes following drug injections were compared in a nonpaired-t test.

STRUCTURE

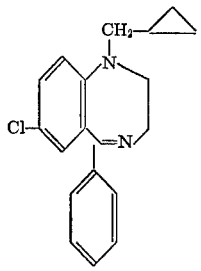

| Dose (mg.) | Feed intake, (kg.) | | | n |
|---|---|---|---|---|
| | 0-60 min. | 60-120 min. | 0-120 min. | |
| Control | .18±.03 | .28±.07 | .46±.07 | 32 |
| 50 | .58±.11 | .15±.06 | .72±.15 | 8 |

Sheep Feed Trials: Two-day average intakes before, during and after the medicated feed were measured and were compared with paired-t tests to determine the effect of the medicated feed on intakes.

STRUCTURE

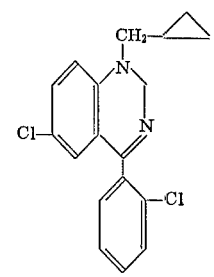

| Dose (mg./kg.) | Feed intake (g.) 2-Day Average | | |
|---|---|---|---|
| | Pre-treatment | Treatment | Post-treatment |
| 1.25 | 1,404±113 | 1,448±111 | 1,434±102 |
| 5.0 | 1,681±124 | 1,728±136 | 1,621±153 |
| 10 | 1,678±52 | 1,812±77 | 1,598±53 |
| 20 | 1,684±67 | 1,905±85 | 1,616±60 |

What we claim is:

1. A method of inducing polyphagia in immature healthy ruminant animals comprising administering to said animals internally in a feed composition or as an implant an effective polyphagic inducing but nontoxic quantity of a compound having the formula:

in which:

A is keto or methylene;
R is trifluoromethyl or halo; and
$R_1$ is trifluoromethyl, halo or, when A is keto, hydrogen.

2. The method of claim 1 in which the compound is 1-cyclopropylmethyl - 7 - chloro-5-o-chlorophenyl-2,3-dihydro-[2H]-1,4-benzodiazepine or one of its nontoxic, stable acid addition salts.

3. The method of claim 1 in which the compound is 1-cyclopropylmethyl - 7 - chloro-5-o-chlorophenyl-1,3-dihydro-[2H]-1,4-dibenzodiazepine-2-one or one of its nontoxic, stable acid addition salts.

4. The method of claim 1 in which the daily dose per ruminant animal is within the range of from about 10 μg. to 2.5 g. of the compound.

5. The method of claim 2 in which the daily oral dose per ruminant animal is within the range of from about 1 mg. to 1 g. of the compound.

6. The method of claim 3 in which the daily oral dose per ruminant animal is within the range of about 1 mg. to 1 g. of the compound.

7. The method of claim 1 in which the daily oral dose per ruminant animal is within the range of from about 100 mg. to 1 g. of the compound.

References Cited

UNITED STATES PATENTS

| 3,248,223 | 4/1966 | Bauernfeind | 424—244 |
| 3,192,200 | 6/1965 | Wuest | 260—239.3 |
| 3,707,539 | 12/1972 | Weber et al. | 424—244 |

VINCENT D. TURNER, Primary Examiner

U.S. Cl. X.R.

260—239.3

UNITED STATES PATENT OFFICE
CERTIFICATE OF CORRECTION

Patent No. 3,851,058　　　　　　　　　Dated November 26, 1974

Inventor(s) Clifton A. Baile, Carol Lynn McLaughlin and Robert Lee Webb

It is certified that error appears in the above-identified patent and that said Letters Patent are hereby corrected as shown below:

Column 5, lines 22-34;
delete the structure below, - - - and replace with:

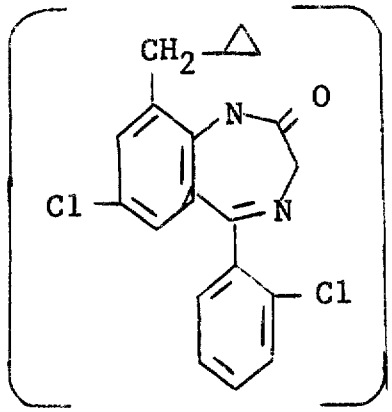 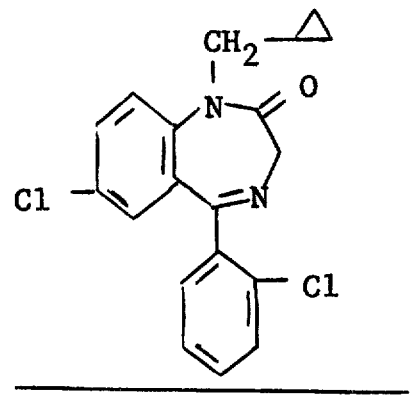

Column 5, lines 55-65;
delete the structure below, - - - and replace with:

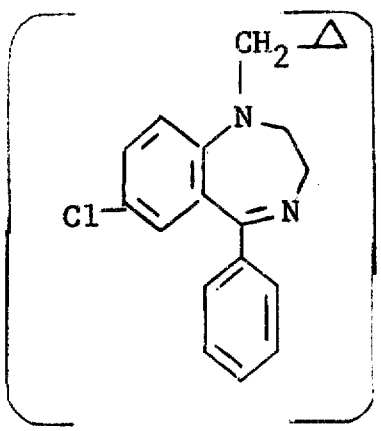 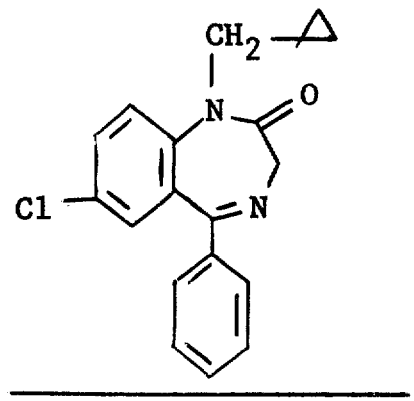

Signed and sealed this 15th day of July 1975.

(SEAL)
Attest:

RUTH C. MASON
Attesting Officer

C. MARSHALL DANN
Commissioner of Patents
and Trademarks